(12) United States Patent
Shirao et al.

(10) Patent No.: US 7,677,350 B2
(45) Date of Patent: Mar. 16, 2010

(54) CONSTRUCTION VEHICLE

(75) Inventors: Atsushi Shirao, Komatsu (JP);
Masanori Ikari, Komatsu (JP)

(73) Assignee: Komatsu LTD., Tokyo (JP)

( * ) Notice: Subject to any disclaimer, the term of this patent is extended or adjusted under 35 U.S.C. 154(b) by 181 days.

(21) Appl. No.: 12/092,339

(22) PCT Filed: Dec. 7, 2006

(86) PCT No.: PCT/JP2006/324435

§ 371 (c)(1),
(2), (4) Date: May 1, 2008

(87) PCT Pub. No.: WO2007/072688

PCT Pub. Date: Jun. 28, 2007

(65) Prior Publication Data

US 2009/0045003 A1 Feb. 19, 2009

(30) Foreign Application Priority Data

Dec. 22, 2005 (JP) ............................. 2005-369867

(51) Int. Cl.
*B60K 17/02* (2006.01)
(52) U.S. Cl. ....................................... 180/305; 180/308
(58) Field of Classification Search ................. 180/305, 180/306, 307, 308
See application file for complete search history.

(56) References Cited

U.S. PATENT DOCUMENTS

| 5,255,590 | A | | 10/1993 | Klemm | |
|---|---|---|---|---|---|
| 5,830,097 | A | * | 11/1998 | Larkin | 475/72 |
| 6,007,444 | A | * | 12/1999 | Kinokami | 475/81 |
| 6,276,134 | B1 | | 8/2001 | Matsuyama et al. | |
| 6,387,005 | B1 | | 5/2002 | Matsuyama et al. | |
| 6,857,986 | B2 | * | 2/2005 | Ikari et al. | 477/64 |
| 6,938,719 | B2 | * | 9/2005 | Ishimaru et al. | 180/305 |
| 6,988,976 | B2 | * | 1/2006 | Potter | 477/115 |
| 7,146,266 | B2 | * | 12/2006 | Teslak et al. | 701/69 |
| 2004/0045785 | A1 | | 3/2004 | Ikari et al. | |
| 2009/0045003 | A1 | * | 2/2009 | Shirao et al. | 180/338 |
| 2009/0197735 | A1 | * | 8/2009 | Usukura | 477/43 |
| 2009/0265065 | A1 | * | 10/2009 | Ikari | 701/50 |

FOREIGN PATENT DOCUMENTS

| JP | 61-92352 A | 5/1986 |
|---|---|---|
| JP | 62-170444 U | 10/1987 |
| JP | 10-30716 A | 2/1998 |
| JP | 11-166623 A | 6/1999 |
| JP | 2000-110938 A | 4/2000 |
| JP | 2001-108062 A | 4/2001 |

* cited by examiner

*Primary Examiner*—Jeffrey J Restifo
(74) *Attorney, Agent, or Firm*—Global IP Counselors

(57) ABSTRACT

The construction vehicle includes an engine, an accelerator pedal, a main pump configured to be driven by the engine, first and second traveling motors driven by pressured oil discharged from the main pump to generate driving force for traveling, a driving shaft configured to receive the driving force from the first traveling motor and the driving force from the second traveling motor, a clutch configured to switch between transmission and non-transmission of the driving force from the second traveling motor to the driving shaft, an accelerator opening degree detection unit, a vehicle velocity detection unit, and a control unit. The control unit is configured to determine the switchover velocity depending on the opening degree of the accelerator pedal, and to control the clutch when the vehicle velocity that is detected by the vehicle velocity detection unit reaches the switchover velocity.

10 Claims, 5 Drawing Sheets

(a) ACCELERATOR OPENING DEGREE D1

(b) ACCELERATOR OPENING DEGREE D2

CONSTRUCTION VEHICLE

CROSS-REFERENCE TO RELATED APPLICATIONS

This U.S. National stage application claims priority under 35 U.S.C. §119(a) to Japanese Patent Application No. 2005-369867, filed in Japan on Dec. 22, 2005. The entire disclosures of Japanese Patent Application No. 2005-369867 are hereby incorporated herein by reference.

TECHNICAL FIELD

Present invention relates to a construction vehicle.

BACKGROUND ART

Some construction vehicles (e.g., wheel loader) traveling by the driving force generated by a plurality of hydraulic motors have been conventionally known. This type of construction vehicle includes two hydraulic motors, that is, a first hydraulic motor and a second hydraulic motor, a driving shaft to which the driving force to be generated in these hydraulic motors is transmitted, and a clutch that is configured to switch between transmission and non-transmission of the driving force from the second hydraulic motor to the driving shaft. In addition, the driving forces from the two hydraulic motors are transmitted to the driving shaft when the clutch is on the engaged state during the low-velocity traveling. Then, when the vehicle velocity increases, the clutch is changed to the non-engagement state. Thus, only the driving force to be generated by the first hydraulic motor is transmitted to the driving shaft (see Japanese Patent Application Publication No. JP-A-2001-108062).

SUMMARY OF THE INVENTION

Clutch switchover shock may be generated in the above described construction vehicle in which traveling by two hydraulic motors (hereinafter called "two-motor traveling mode") and traveling by one hydraulic motor (hereinafter called "one-motor traveling mode") are switched over by a clutch when the clutch is switched over in the construction vehicle. For the purpose of reducing the clutch switchover shock, it is desirable to switch over the clutch in a condition that the traction force during the two-motor traveling mode matches the traction force during the one-motor traveling mode. Because of this, it is possible to reduce the clutch switchover shock by calculating velocity at which the traction force during the two-motor traveling mode matches the traction force during the one-motor traveling mode and by switching over the clutch when the vehicle velocity of the construction vehicle reaches the above velocity.

However, the clutch switchover shock is easily generated in the above described conventional construction vehicle, because clutch thereof is switched over when the vehicle velocity reaches predetermined velocity. In other words, the velocity at which the traction force during the two-motor traveling mode matches the traction force during the one-motor traveling mode is not necessarily constant, and may vary depending on the rotation speed of the engine and/or the accelerator opening degree. Even in this case, if the clutch is switched over when the vehicle velocity reaches predetermined velocity, the clutch is supposed to be switched over in a state that the traction force during the two-motor traveling mode does not match the traction force during the one-motor traveling mode. Accordingly, there is a possibility that the clutch switchover shock is generated.

An object of the present invention is to provide a construction vehicle that is capable of reducing the clutch switchover shock.

A construction vehicle of a first aspect of the invention includes an engine, an accelerator, a hydraulic pump, a first hydraulic motor, a second hydraulic motor, a driving shaft, a clutch, an accelerator opening degree detection unit, a vehicle velocity detection unit, and a control unit. The accelerator serves to control a rotation speed of the engine. The hydraulic pump is configured to be driven by the engine. The first hydraulic motor and the second hydraulic motor are configured to be driven by the pressured oil discharged from the hydraulic pump, and to respectively generate a driving force for traveling. The driving shaft is configured to receive the driving force from the first hydraulic motor and the driving force from the second hydraulic motor. The clutch is configured to selectively switch between a transmission state and a non-transmission state of the driving force from the second hydraulic motor to the driving shaft. The accelerator opening degree detection unit is configured to detect an accelerator opening degree. The vehicle velocity detection unit is configured to detect a vehicle velocity of the construction vehicle. The control unit is configured to determine a switchover velocity depending on the accelerator opening degree detected by the accelerator opening degree detection unit, and to control the clutch to switch between the transmission state and the non-transmission state when the vehicle velocity detected by the vehicle velocity detection unit reaches the switchover velocity.

In the construction vehicle, the clutch is switched over when the vehicle velocity detected by the vehicle velocity detection unit reaches predetermined switchover velocity, and the switchover velocity is velocity corresponding to the accelerator opening degree detected by the accelerator opening degree detection unit. Because of this, it is possible to switch over the clutch at appropriate switchover velocity with less clutch switchover shock depending on the accelerator opening degree. Accordingly, it is possible to reduce the clutch switchover shock in the construction vehicle.

A construction vehicle of a second aspect of the invention is the construction vehicle of the first aspect of the invention, and the control unit is further configured to select a first velocity as the switchover velocity when the accelerator opening degree is in a first opening degree, and to select a second velocity that is different from the first velocity as the switchover velocity when the accelerator opening degree is in a second opening degree that is different from the first opening degree.

In the construction vehicle, the clutch is switched over when the vehicle velocity reaches the first velocity if the accelerator opening degree is in the first opening degree, and is switched over when the vehicle velocity reaches the second velocity if the accelerator opening degree is in the second opening degree. Because of this, it is possible to switch over the clutch at appropriate switchover velocity with less clutch switchover shock depending on the accelerator opening degree. Accordingly, it is possible to reduce the clutch switchover shock in the construction vehicle.

A construction vehicle of a third aspect of the invention is the construction vehicle of the second aspect of the invention, and the first velocity is set to a velocity at which the traction force during the one-motor traveling mode matches the traction force during the two-motor traveling mode when the accelerator opening degree is in the first opening degree. In addition, the second velocity is set to a velocity at which the traction force during the one-motor traveling mode matches the traction force during the two-motor traveling mode when the accelerator opening degree is the second opening degree.

In the construction vehicle, the traction force during the one-motor traveling mode matches the traction force during the two-motor traveling mode when the vehicle velocity reaches the first velocity in a state that the accelerator opening degree is the first opening degree. Then, the clutch is switched over in this condition. In addition, the traction force during the one-motor traveling mode matches the traction force during the two-motor traveling mode when the vehicle velocity reaches the second velocity in a state that the accelerator opening degree is the second opening degree. Then, the clutch is switched over in this condition. Accordingly, it is possible to reduce the clutch switchover shock.

A construction vehicle of a fourth aspect of the invention is the construction vehicle of the second aspect of the invention, and the control unit is further configured to select the first velocity as the switchover velocity when the accelerator opening degree is within a first opening degree range, and to select the second velocity as the switchover velocity when the accelerator opening degree is within a second opening degree range that is different from the first opening degree range.

In the construction vehicle, the clutch is switched over when the vehicle velocity reaches the first velocity in a state that the accelerator opening degree is within the first opening degree range, and is switched over when the vehicle velocity reaches the second velocity in a state that the accelerator opening degree is within the second opening degree range. Because of this, it is possible to switch over the clutch at appropriate switchover velocity with less clutch switchover shock depending on the accelerator opening degree. Accordingly, it is possible to reduce the clutch switchover shock in the construction vehicle.

A construction vehicle of a fifth aspect of the invention is the construction vehicle of one of the first to fourth aspects of the inventions, and the switching velocity increases or decreases depending on increase or decrease of the accelerator opening degree when the accelerator opening degree is at least within a predetermined opening degree range.

In the construction vehicle, the clutch is switched over at greater switchover velocity as the accelerator opening degree becomes greater at least within the predetermined opening degree range. Here, the velocity at which the traction force during the one-motor traveling mode matches the traction force during the two-motor traveling mode becomes greater as the accelerator opening degree becomes greater. Accordingly, in the construction vehicle, it is possible to select appropriate switchover velocity depending on increase or decrease of the accelerator opening degree.

A construction vehicle of a sixth aspect of the invention includes an engine, a hydraulic pump, a first hydraulic motor, a second hydraulic motor, a driving shaft, a clutch, an engine rotation speed detection unit, a vehicle velocity detection unit, and a control unit. The hydraulic pump is configured to be driven by the engine. The first hydraulic motor and the second hydraulic motor are configured to be driven by the pressured oil to be discharged from the hydraulic pump, and generate driving force for traveling, respectively. The driving shaft is configured to receive the driving force from the first hydraulic motor and the driving force from the second hydraulic motor. The clutch is configured to selectively switch between a transmission state and a non-transmission state of the driving force from the second hydraulic motor to the driving shaft. The engine rotation speed detection unit is configured to detect a rotation speed of the engine. The vehicle velocity detection unit is configured to detect a vehicle velocity. The control unit is configured to determine the switchover velocity depending on the rotation speed of the engine that is detected by the engine rotation speed detection unit, and to control the clutch to switch between the transmission state and the non-transmission state when the vehicle velocity detected by the vehicle velocity detection unit reaches the switchover velocity.

In the construction vehicle, the clutch is switched over when the vehicle velocity detected by the vehicle velocity detection unit reaches predetermined switchover velocity, and the switchover velocity is velocity corresponding to the rotation speed of the engine that is detected by the engine rotation speed detection unit. Because of this, it is possible to switch over the clutch at appropriate switchover velocity with less clutch switchover shock depending on the rotation speed of the engine. Accordingly, it is possible to reduce the clutch switchover shock in the construction vehicle.

A construction vehicle of a seventh aspect of the invention is the construction vehicle of the sixth aspect of the invention, and the control unit is further configured to select a first velocity as the switchover velocity when the rotation speed of the engine is in a first engine rotation speed, and to select a second velocity that is different from the first velocity as the switchover velocity when the rotation speed of the engine is in a second engine rotation speed that is different from the first engine rotation speed.

In the construction vehicle, the clutch is switched over when the vehicle velocity reaches the first velocity in a state that the rotation speed of the engine is in the first engine rotation speed, and is switched over when the vehicle velocity reaches the second velocity in a state that the rotation speed of the engine is in the second engine rotation speed. Because of this, it is possible to switch over the clutch at appropriate switchover velocity with less clutch switchover shock depending on the rotation speed of the engine. Accordingly, it is possible to reduce the clutch switchover shock in the construction vehicle.

A construction vehicle of an eighth aspect of the invention is the construction vehicle of the seventh aspect of the invention, and the first velocity is set to a velocity at which the traction force during one-motor traveling mode matches the traction force during two-motor traveling mode when the rotation speed of the engine is in the first engine rotation speed. In addition, the second velocity is set to a velocity at which the traction force during the one-motor traveling mode matches the traction force during the two-motor traveling mode in a state that the rotation speed of the engine is in the second engine rotation speed, and the second velocity is different from the first velocity.

In the construction vehicle, the traction force during the one-motor traveling mode matches the traction force during the two-motor traveling mode when the vehicle velocity reaches the first velocity in a state that the rotation speed of the engine is in the first engine rotation speed. Then, the clutch is switched over in this condition. In addition, the traction force during the one-motor traveling mode matches the traction force during the two-motor traveling mode when the vehicle velocity reaches the second velocity in a state that the rotation speed of the engine is in the second engine rotation speed. Then, the clutch is switched over in this condition. Accordingly, it is possible to reduce the clutch switchover shock.

A construction vehicle of a ninth aspect of the invention is the construction vehicle of the seventh aspect of the invention, and the control unit is further configured to select the first velocity as the switchover velocity when the rotation speed of the engine is within a first rotation speed range, and to select the second velocity as the switchover velocity when the rotation speed of the engine is within a second rotation speed range that is different from the first rotation speed range.

In the construction vehicle, the clutch is switched over when the vehicle velocity reaches the first velocity in a state that the rotation speed of the engine is within the first rotation speed range, and is switched over when the vehicle velocity reaches the second velocity in a state the rotation speed of the engine is within the second rotation speed range. Because of this, it is possible to switch over the clutch at appropriate switchover velocity with less clutch switchover shock depending on the rotation speed of the engine. Accordingly, it is possible to reduce the clutch switchover shock in the construction vehicle.

A construction vehicle of a tenth aspect of the invention is the construction vehicle of one of the sixth to ninth aspects of the inventions, and the switchover velocity increases or decreases depending on increase or decrease of the rotation speed of the engine in a state that the rotation speed of the engine is at least within a predetermined rotation speed range.

In the construction vehicle, the clutch is switched over at greater switchover velocity as the rotation speed of the engine becomes greater when the rotation speed of the engine is at least within the predetermined rotation speed range. Here, the velocity at which the traction force during the one-motor traveling mode matches the traction force during the two-motor traveling mode becomes greater as the rotation speed of the engine becomes greater. Accordingly, in the construction vehicle, it is possible to select appropriate switchover velocity depending on increase or decrease of the accelerator opening degree.

DETAILED DESCRIPTION OF THE PREFERRED EMBODIMENTS

Figure 1:
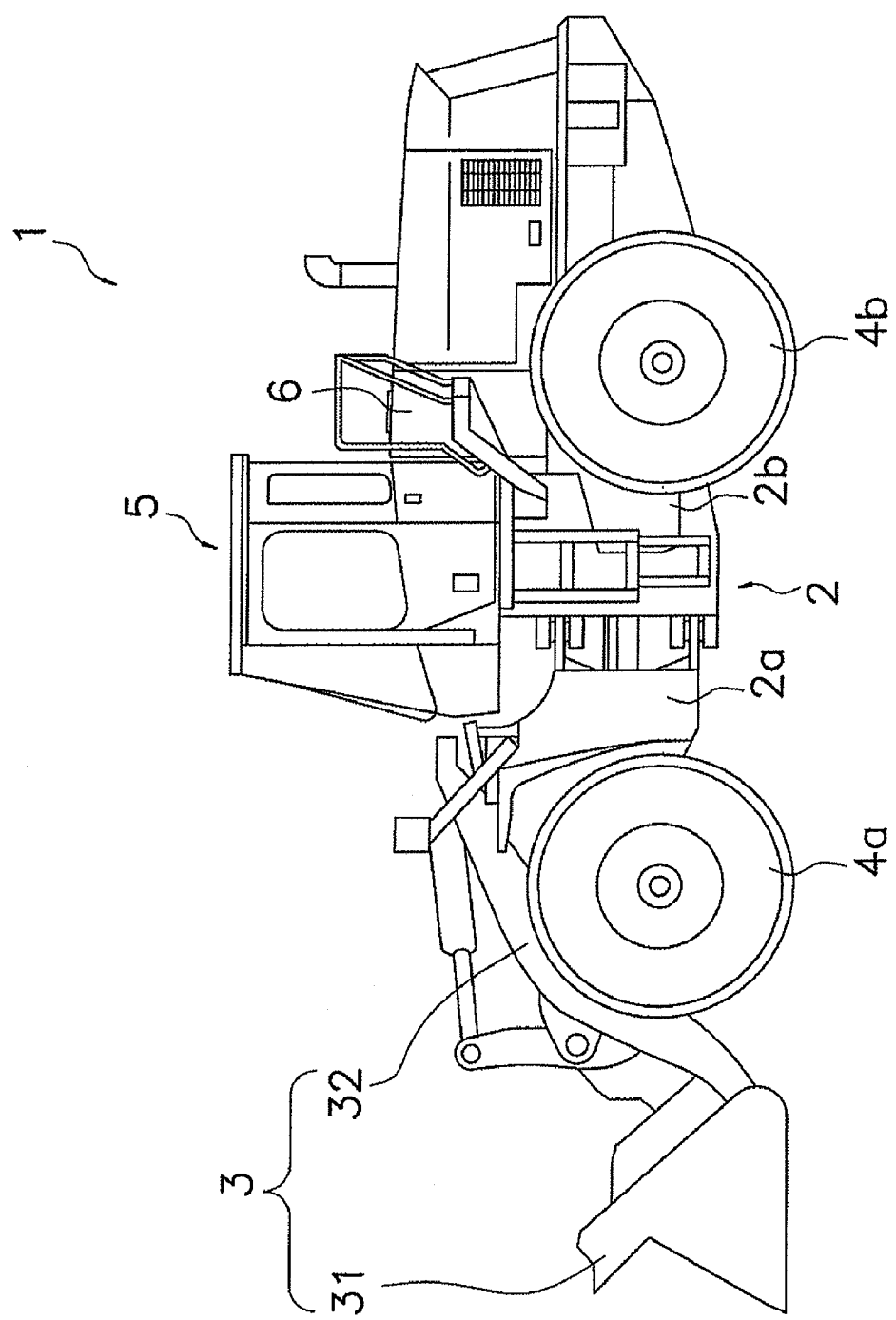
FIG. 1 is a side elevational view of a construction vehicle.

FIG. 1 is a lateral view of a construction vehicle 1 in accordance with an embodiment of the present invention. The construction vehicle 1 is an automotive wheel loader with tires 4a and 4b and is capable of performing a desired operation with an operating machine 3. The construction vehicle 1 includes a vehicle body frame 2, the operating machine 3, the tires 4a and 4b, and an operator cab 5.

The vehicle body frame 2 includes a front frame 2a that is disposed on the front side thereof, and a rear frame 2b that is disposed on the rear side thereof. The front frame 2a and the rear frame 2b are coupled to each other in the center of the vehicle body frame 2 so as to be capable of pivoting in the right-to-left direction.

The operating machine 3 and a pair of front tires 4a are attached to the front frame 2a. The operating machine 3 is a device that is driven by the hydraulic oil pressurized by an operating machine hydraulic pump (not illustrated in the figure). The operating machine 3 includes a lift arm 32 that is mounted to the front part of the front frame 2a, a bucket 31 that is mounted to the tip of the lift arm 32, and a hydraulic cylinder for driving these members. The front tires 4a are provided on the lateral surfaces of the front frame 2a, and are driven by a hydraulic driving mechanism 7 to be described.

The rear frame 2b is provided with the operator cab 5, a hydraulic oil tank 6, the pair of rear tires 4b, and the like. The operator cab 5 is mounted on the top of the vehicle body frame 2, and an operating unit such as a seat, a handle and an accelerator pedal 16 (see FIG. 2), a display unit for displaying a variety of information such as velocity, and the like are provided in the interior of the operator cab 5. The hydraulic oil tank 6 is disposed on the backward of the operator cab 5, and stores hydraulic oil to be pressurized by a variety of hydraulic pumps. The rear tires 4b are provided on the lateral surfaces of the rear frame 2b, and are driven by the hydraulic driving mechanism 7 to be described.

Figure 2:
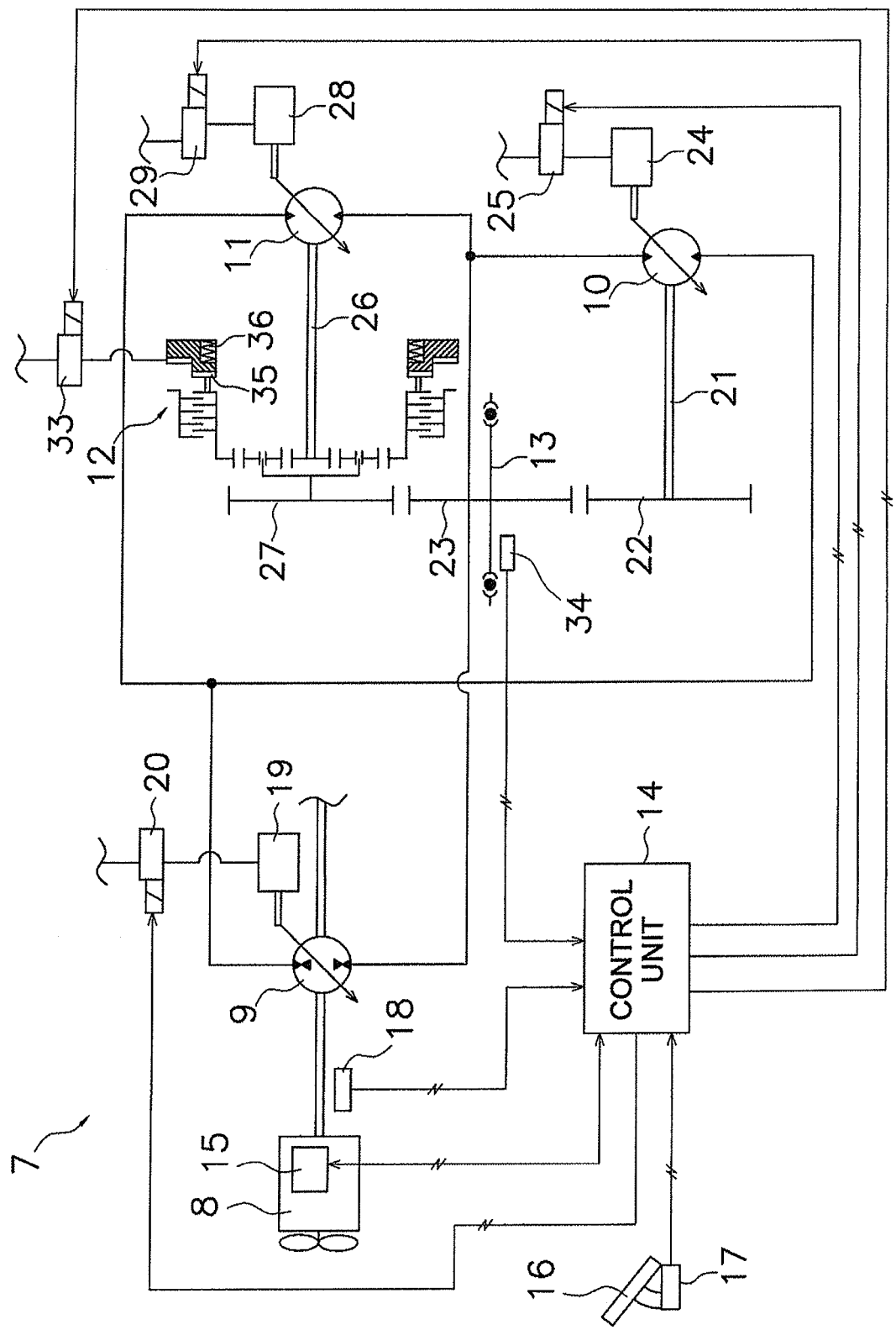
FIG. 2 is a schematic diagram for illustrating a configuration of a hydraulic driving mechanism.

In addition, the hydraulic driving mechanism 7 illustrated in FIG. 2 is installed in the vehicle body frame 2. The configuration of the hydraulic driving mechanism 7 will be hereinafter explained.

Hydraulic Driving Mechanism 7

The hydraulic driving mechanism 7 mainly includes an engine 8, a main pump 9, a first traveling motor 10, a second traveling motor 11, a clutch 12, a driving shaft 13, and a control unit 14, and a so-called HST (Hydro Static Transmission) system is employed therein.

The engine 8 is a diesel engine, and output torque generated in the engine 8 is transmitted to the main pump 9, an operating machine hydraulic pump (not illustrated in the figure), a steering hydraulic pump (not illustrated in the figure), and the like. A fuel injection device 15, which controls the output torque and rotation speed of the engine 8, is attached to the engine 8, and regulates the amount of fuel injection depending on opening degree of the accelerator pedal 16 (hereinafter called "accelerator opening degree"). The accelerator pedal 16 is means for instructing the target rotation speed of the engine 8, and an accelerator opening degree detection unit 17, which is made up of a potentiometer for detecting the accelerator opening degree, is coupled to the accelerator pedal 16. An opening signal for indicating the accelerator opening degree is transmitted from the accelerator opening degree detection unit 17 to the control unit 14, and a control signal is outputted from the control unit 14 to the fuel injection device 15. Accordingly, an operator is allowed to control the rotation speed of the engine 8 by regulating the operation amount of the accelerator pedal 16. In addition, the engine 8 is provided with an engine rotation speed detection unit 18 that is made up of a rotation sensor for detecting the actual rotation speed of the engine 8. A rotation speed signal outputted from the engine rotation speed detection unit 18 is inputted into the control unit 14.

The main pump 9 is a variable capacity type hydraulic pump that is driven by the engine 8. The main pump 9 is provided with a regulator 19 for regulating the tilt rotation angle of a swash plate of the main pump 9 by making use of the pressured oil to be discharged from the main pump 9, and an electromagnetic control valve 20 for controlling the regulator 19 based on a control signal from the control unit 14.

The first traveling motor 10 is a variable capacity type hydraulic motor. The first traveling motor 10 is driven by the pressured oil to be discharged from the main pump 9, and generates driving force for traveling. The first traveling motor 10 is a hydraulic motor that is suitable for high-velocity traveling. A first gear 22 is fixed to a first output shaft 21 of the first traveling motor 10, and the first gear 22 is meshed with a third gear 23 that is fixed to the driving shaft 13. In addition, the first traveling motor 10 is provided with a first motor cylinder 24 for controlling the tilt rotation angle of the first traveling motor 10, and an electromagnetic control valve 25 for controlling the first motor cylinder 24 based on a control signal from the control unit 14.

As is the case with the first traveling motor 10, the second traveling motor 11 is a variable capacity type hydraulic motor that is driven by the pressured oil to be discharged from the main pump 9 and generates the driving force for traveling. The second traveling motor 11 is a hydraulic motor that is suitable for low-velocity traveling and large torque is generated therein. The second traveling motor 11 is disposed on the hydraulic circuit in parallel with the first traveling motor 10. A second output shaft 26 of the second traveling motor 11 is coupled to a second gear 27 through the clutch 12, and the second gear 27 is meshed with the third gear 23 that is fixed to the driving shaft 13. In addition, the second traveling motor 11 is provided with a second motor cylinder 28 for controlling the tilt rotation angle of the second traveling motor 11, and an electromagnetic control valve 29 for controlling the second motor cylinder 28 based on a control signal from the control unit 14.

The clutch 12 is a device for switching between transmission and non-transmission of the driving force from the second traveling motor 11 to the driving shaft 13. The clutch 12 includes an oil room 35 and a spring 36 in the interior thereof. The clutch 12 is set to be an engagement state by the urging force of the spring 36 in a state that the pressured oil is not supplied to the oil room 35. In addition, when the pressured oil is supplied to the oil room 35 and then the pressure applied by the pressured oil exceeds the urging force of the spring 36, the clutch 12 is set to be a non-engagement state. The clutch 12 is provided with an electromagnetic control valve 33 for controlling supply and recovery of the pressured oil to the oil room 35 based on a control signal from the control unit 14. The clutch 12 is switched between engagement and non-engagement by a control signal from the control unit 14. The clutch 12 transmits the driving force from the second traveling motor 11 to the driving shaft 13 on the engagement state, and does not transmit the driving force from the second traveling motor 11 to the driving shaft 13 on the non-engagement state.

The driving shaft 13 rotates the tires 4a and 4b (see FIG. 1) by receiving and transmitting the driving force generated by the first traveling motor 10 and the driving force generated by the second traveling motor 11 to the tires 4a and 4b. When the clutch 12 is on the engagement state, the driving shaft 13 receives both of the driving force from the first traveling motor 10 and the driving force from the second traveling motor 11 and transmits the both driving forces to the tires 4a and 4b. On the other hand, when the clutch 12 is on the non-engagement state, the driving shaft 13 does not receive the driving force from the second traveling motor 11 and only receives the driving force from the first traveling motor 10 and transmits the received driving force to the tires 4a and 4b. In addition, the driving shaft 13 is provided with a vehicle velocity detection unit 34 that is made up of a vehicle velocity sensor for detecting vehicle velocity based on rotation speed of the driving shaft 13, and a vehicle velocity signal outputted from the vehicle velocity detection unit 34 is inputted into the control unit 14.

The control unit 14 controls traveling of the construction vehicle 1, driving of the operating machine 3, and the like by controlling the electromagnetic control valves 20, 25, 29, and 33, and the fuel injection device 15 based on an output signal from a variety of sensors. In addition, the control unit 14 is allowed to control torque during traveling, the vehicle velocity, and the like by switching over the clutch 12 between engagement and non-engagement when the vehicle velocity reaches predetermined switchover velocity. Switchover control of the clutch 12 by the control unit 14 will be hereinafter explained.

Switchover Control of Clutch 12

The construction vehicle 1 travels by the driving forces generated by the two traveling motors, that is, the first traveling motor 10 and the second traveling motor 11, during the low-velocity traveling (hereinafter called "two-motor traveling mode"). Accordingly, the low-velocity and high-torque traveling is achieved in the construction vehicle 1. On the other hand, the construction vehicle 1 travels by the driving force generated by the first traveling motor 10 without using the driving force generated by the second traveling motor 11 during the high-velocity traveling (hereinafter called "one-motor traveling mode"). Accordingly, the high-velocity and low-torque traveling is achieved in the construction vehicle 1. Switchover between the one-motor traveling mode and the two-motor traveling mode is performed by switching over the clutch 12 between engagement and non-engagement, and is also performed when the vehicle velocity of the construction vehicle 1 reaches predetermined switchover velocity.

Selection of Switchover Velocity

The switchover velocity is velocity at which the traction force of the construction vehicle 1 during the one-motor traveling mode matches the traction force of the construction vehicle 1 during the two-motor traveling mode. As described below, the switchover velocity is set depending on the accelerator opening degree.

Figure 3:
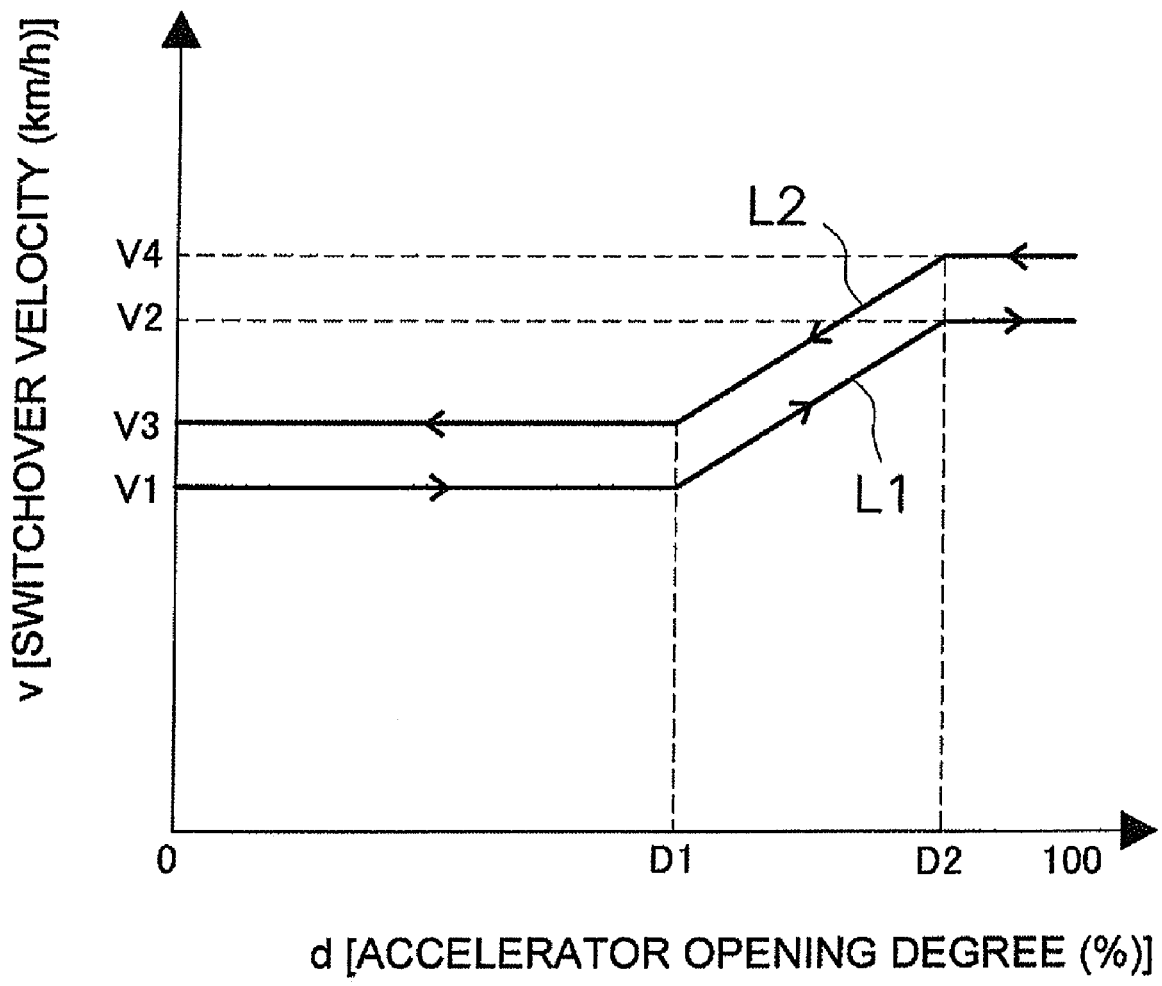
FIG. 3 is a chart for illustrating relation between an accelerator opening degree and a switchover velocity.

FIG. 3 shows the relation between accelerator opening degree (d) and switchover velocity (v). In FIG. 3, the horizontal axis is the accelerator opening degree, and it is expressed in percentage. Here, a state that the accelerator pedal 16 is not operated is set to be zero, and a state that the accelerator pedal 16 is fully operated is set to be 100. The vertical axis is the switchover velocity. In addition, Chart L1 shows the relation between the accelerator opening degree and the switchover velocity in acceleration, and Chart L2 shows the relation between the accelerator opening degree and the switchover velocity in deceleration.

In acceleration, the switching speed is set to be V1 (first speed) where the accelerator opening degree falls in the range of $0 \leq d \leq D1$ (first opening degree range, D1; first opening degree), and is constant in this range of the acceleration opening degree. The switchover velocity is not constant in the range of $D1 < d \leq D2$ (third opening degree range or predetermined opening degree range), and increases as the accelerator opening degree increases. More specifically, the switchover velocity increases linear-functionally as the accelerator opening degree increases. Note that the switchover velocity is V2 (>V1) where the accelerator opening degree is D2 (second opening degree). In addition, the switchover velocity is V2 (second velocity) in the range of $D2 < d \leq 100$ (second opening degree range), and is constant in this range of the accelerator opening degree.

Figure 4:
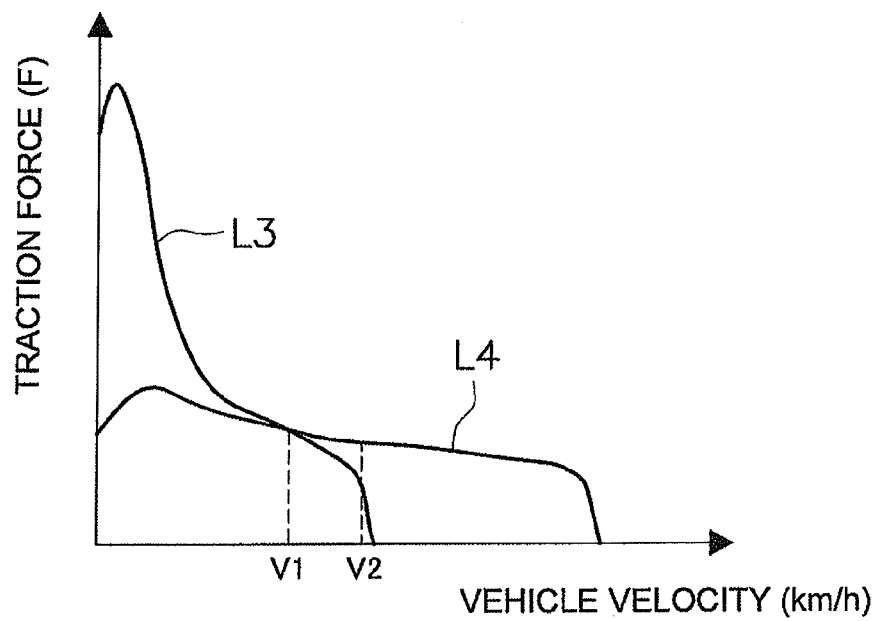
FIG. 4 includes charts for illustrating relation between a vehicle velocity and a traction force of a construction vehicle.
Figure 4:
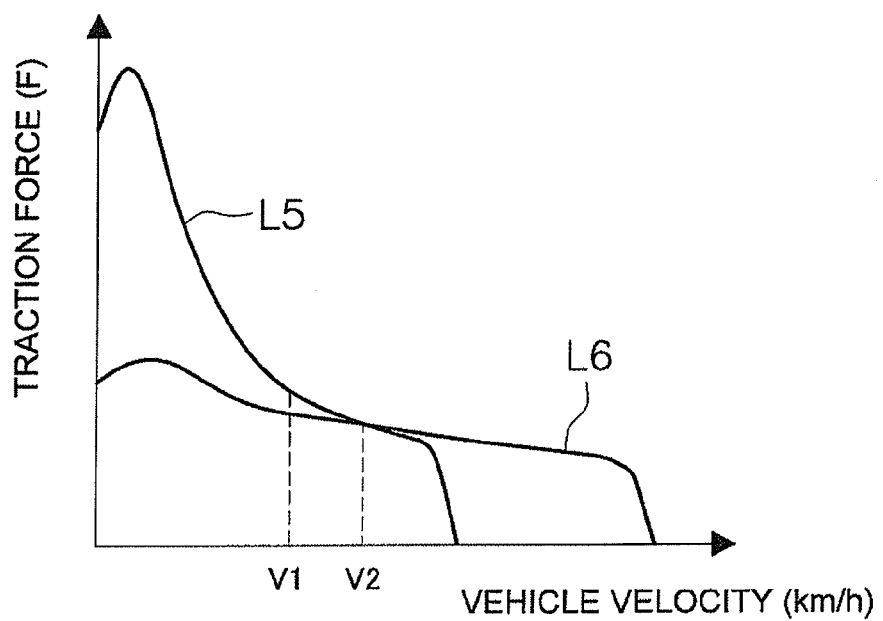

Here, as illustrated in FIG. 4(a), V1 is velocity at which the traction force during the one-motor traveling mode matches the traction force during the two-motor traveling mode in a state that the accelerator opening degree is D1. Note that FIG. 4(a) illustrates the relation between the traction force and the vehicle velocity of the construction vehicle 1 when the accelerator opening degree is D1 in acceleration. Here, Chart L3 shows the relation between the traction force and the vehicle velocity during the two-motor traveling mode, and Chart L4 shows the relation between the traction force and the vehicle velocity during the one-motor traveling mode. In addition, as illustrated in FIG. 4(b), V2 is velocity at which the traction force during the one-motor traveling mode matches the traction force during the two-motor traveling mode in a state that the accelerator opening degree is D2. Note that FIG. 4(b) illustrates the relation between the traction force and the vehicle velocity of the construction vehicle 1 when the accelerator opening degree is D2 in acceleration. Here, Chart L5 shows the relation between the traction force and the vehicle velocity during the two-motor traveling mode, and Chart L6 shows the relation between the traction force and the vehicle velocity during the one-motor traveling mode.

Next, the relation between the accelerator opening degree and the switchover velocity in deceleration will be explained. In FIG. 3, the switchover velocity is V4 in the range of D2<d≦100, and is constant in this range of the accelerator opening degree. It should be noted that V4>V2. The switchover velocity is not constant in the range of D1<d≦D2, and decreases as the accelerator opening degree decreases. More specifically, the switchover velocity decreases linear-functionally as the accelerator opening degree decreases. Note that the switchover velocity is V3 (<V4) where the accelerator opening degree is D1. It should be noted that V1<V3<V2. Also, the switchover velocity is V3 in the range of 0≦d<D1, and is constant in this range of the accelerator opening degree. Note that V4 is velocity at which the traction force during the one-motor traveling mode matches the traction force during the two-motor traveling mode in a state the accelerator opening degree is D2 in deceleration, although this is not illustrated in the figure. Also, V3 is velocity at which the traction force during the one-motor traveling mode matches the traction force during the two-motor traveling mode in a state that the accelerator opening degree is D1 in deceleration.

Operation in Switching Over Clutch

The clutch 12 is on the engaged state during the low-velocity traveling, and the two-motor traveling mode is performed. When the construction vehicle 1 is accelerated in this condition, the control unit 14 judges if the vehicle velocity reaches the switchover velocity that corresponds to the accelerator opening degree. For example, when the accelerator opening degree detected by the accelerator opening degree detection unit 17 is D1, V1 is selected as the switchover velocity and the control unit 14 judges if the vehicle velocity reaches V1. Then, if the vehicle velocity increases and then reaches V1, the control unit 14 switches over the clutch 12 to the non-engaged state by controlling the electromagnetic control valve 33. Accordingly, traveling of the construction vehicle 1 is switched from the two-motor traveling mode to the one-motor traveling mode. In addition, when the accelerator opening degree detected by the accelerator opening degree detection unit 17 is D2, V2 is selected as the switchover velocity and the control unit 14 switches over the clutch 12 to the non-engaged state when the vehicle velocity increases and then reaches V2. Accordingly, traveling of the construction vehicle 1 is switched from the two-motor traveling mode to the one-motor traveling mode when the vehicle velocity reaches not V1 but V2 in a state that the accelerator opening degree is D2.

Next, in a condition that the clutch 12 is on the non-engaged state and the one-motor traveling mode is performed, when the construction vehicle 1 is decelerated, the control unit 14 judges if the vehicle velocity reaches the switchover velocity that corresponds to the accelerator opening degree. For example, when the accelerator opening degree detected by the accelerator opening degree detection unit 17 is D1, V3 is selected as the switchover velocity and the control unit 14 judges if the vehicle velocity reaches V3. Then, if the vehicle velocity decreases and then reaches V3, the control unit 14 switches over the clutch 12 to the engaged state by controlling the electromagnetic control valve 33. Accordingly, traveling of the construction vehicle 1 is switched from the one-motor traveling mode to the two-motor traveling mode. In addition, when the accelerator opening degree detected by the accelerator opening degree detection unit 17 is D2, V4 is selected as the switchover velocity and the control unit 14 switches over the clutch 12 to the engaged state when the vehicle velocity reaches V4. Accordingly, traveling of the construction vehicle 1 is switched from the one-motor traveling mode to the two-motor traveling mode when the vehicle velocity reaches not V3 but V4 in a state that the accelerator opening degree is D2.

In this construction vehicle 1, appropriate velocity at which the traction force during the one-motor traveling mode matches the traction force during the two-motor traveling mode depending on the accelerator opening degree is selected as the switchover velocity. Accordingly, it is possible to reduce the clutch switchover shock to be generated when the one-motor traveling mode is switched over to the two-motor traveling mode and when the two-motor traveling mode is switched over to the one-motor traveling mode.

For example, as illustrated in FIG. 4(a), when the vehicle velocity is V1 in a state that the accelerator opening degree is D1, the traction force during the one-motor traveling mode matches the traction force during the two-motor traveling mode. Because of this, if the clutch 12 is switched over when the vehicle velocity reaches V1, the clutch switchover shock will not be generated too much. On the other hand, as illustrated in FIG. 4(b), when the vehicle velocity is V1 in a state that the accelerator opening degree is D2, the traction force during the one-motor traveling mode does not match the traction force during the two-motor traveling mode. Because of this, if the clutch 12 is switched over when the vehicle velocity reaches V1 even in a state that the accelerator opening degree is D2, relatively large amount of clutch switchover shock will be generated.

However, in the construction vehicle 1, the clutch 12 is switched over when the vehicle velocity reaches not V1 but V2 in a state that the accelerator opening degree is D2. In other words, in the construction vehicle 1, it is possible to vary the switchover velocity depending on the accelerator opening degree. Because of this, it is possible to reduce occurrence of the clutch switchover shock, compared to a case that the switchover velocity is fixedly set regardless of the acceleration opening degree.

Note that the switchover velocity is fixed in the range of 0≦d≦D1 in FIG. 3. However, the vehicle velocity does not increase too much in this range even if the accelerator pedal 16 is operated, and does not reach the switchover velocity. Therefore, a problem of the clutch switching shock is not originally generated. Also, the switchover velocity is also fixedly set in the range of D2<d≦100. However, velocity at which the traction force during the one-motor traveling mode matches the traction force during the two-motor traveling mode is approximately the same in this range. Therefore, it is possible to achieve an effect of reducing the clutch switchover shock.

Other Embodiments (A) In the above described embodiment, the switchover velocity is selected depending on the accelerator opening degree detected by the accelerator opening degree detection unit 17. However, the switchover velocity may be selected depending on the rotation speed of the engine detected by the engine rotation speed detection unit 18.

Figure 5:
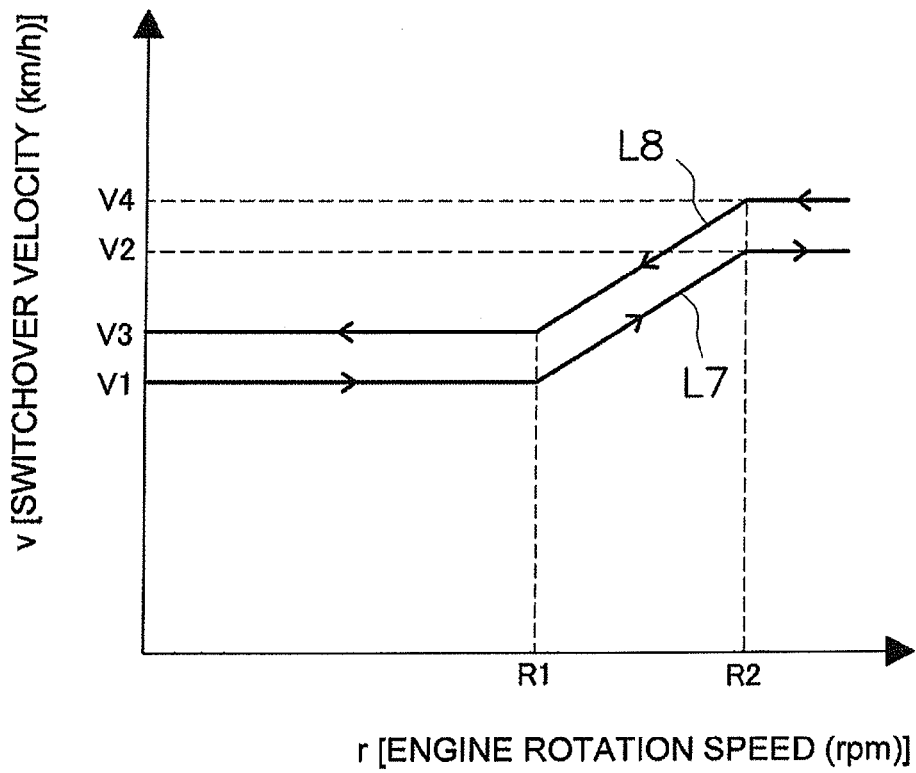
FIG. 5 is a chart for illustrating relation between an engine rotation speed and the switchover velocity.

FIG. 5 shows the relation between the engine rotation speed (r) and the switchover velocity (v). In FIG. 5, the horizontal axis is the engine rotation speed, and the vertical axis is the switchover velocity. In addition, Chart L7 shows the relation between the engine rotation speed and the switchover velocity in acceleration, and Chart L8 shows the relation between the engine rotation speed and the switchover velocity in deceleration.

In acceleration, the switching speed is set to be V1 (first speed) where the rotation speed of the engine falls in the range of $0 \leq r \leq R1$ (first engine rotation speed range, R1; first engine rotation speed), and is constant in this range of the engine rotation speed. The switchover velocity is not constant in the range of $R1 < r \leq R2$ (third rotation speed range or predetermined rotation speed range), and increases as the engine rotation speed increases. Note that the switchover velocity is V2 (second velocity) where the rotation speed of the engine is R2 (second engine rotation speed). In addition, the switchover velocity is V2 in the range of $R2 < r \leq 100$ (second rotation speed range), and is constant in this range of the engine rotation speed.

In deceleration, the switching speed is set to be V4 in the range of $R2 < r \leq 100$, and is constant in this range of the engine rotation speed. The switchover velocity is not constant in the range of $R1 < r \leq R2$, and decreases as the rotation speed of the engine decreases. Note that the switchover velocity is V3 where the rotation speed of the engine is R1. Also, the switchover velocity is V3 in the range of $0 \leq r < R1$, and is constant in this range of the rotation speed of the engine.

Even when the switchover velocity s selected depending on the rotation speed of the engine, it is possible to achieve almost the same effect as the above described embodiment.

Figure 6:
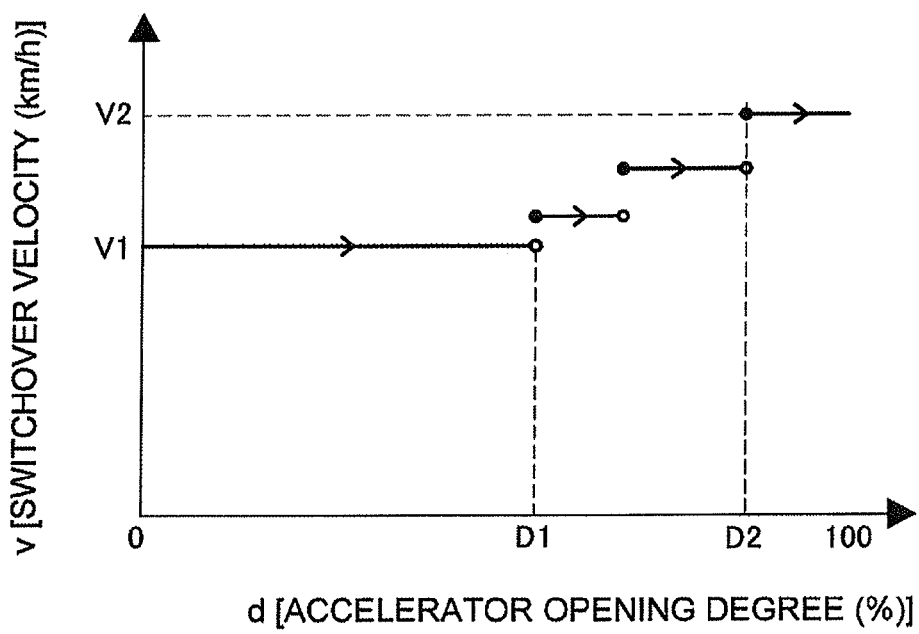
FIG. 6 is a chart for illustrating relation between the accelerator opening degree and the switchover velocity in accordance with an alternative embodiment.

(B) In the above described embodiment, the switchover velocity continuously increases or decreases depending on increase or decrease of the accelerator opening degree as illustrated in FIG. 3. However, the switchover velocity may increase or decrease in stages depending on increase or decrease of the accelerator opening degree as illustrated in FIG. 6. Note that FIG. 6 only shows the relation between the accelerator opening degree and the switchover velocity in acceleration. However, almost the same relation is also obtained in deceleration. In addition, the relation between the rotation speed of the engine and the switchover velocity is also almost the same as this.

(C) In the above described embodiment, as illustrated in FIG. 3, the switchover velocity linearly increases/decreases in the range of $D1 < d \leq D2$ depending on increase/decrease of the accelerator opening degree. However, the relation between the switchover velocity and the accelerator opening degree is not necessarily limited to this. It is possible to set the switchover velocity to any speed as long as the switchover velocity is a speed at which the traction force during the one-motor traveling matches the traction force during the two-motor traveling mode in each of the accelerator opening degrees. Note that the relation between the rotation speed of the engine and the switchover velocity is also almost the same as this.

(D) In the above described embodiment, the present invention is applied to the wheel loader. However, the present invention may be applied to a construction vehicle excluding the wheel loader.

The present invention has an effect that the clutch switchover shock is reduced, and is useful as a construction vehicle.

The invention claimed is:

1. A construction vehicle, comprising:
an engine;
an accelerator configured to control a rotation speed of the engine;
a hydraulic pump configured to be driven by the engine;
first and second hydraulic motors configured to be driven by pressured oil discharged by the hydraulic pump, the first and second hydraulic motors being configured to respectively generate a driving force for traveling;
a driving shaft configured to receive the driving force from the first hydraulic motor and the driving force from the second hydraulic motor;
a clutch configured to selectively switch between a transmission state and a non-transmission state of the driving force from the second hydraulic motor to the driving shaft;
an accelerator opening degree detection unit configured to detect an accelerator opening degree;
a vehicle velocity detection unit configured to detect a vehicle velocity; and
a control unit configured to determine a switchover velocity depending on the accelerator opening degree detected by the accelerator opening degree detection unit, the control unit being configured to control the clutch to switch between the transmission state and the non-transmission state when the vehicle velocity detected by the vehicle velocity detection unit reaches the switchover velocity.

2. The construction vehicle of claim 1, wherein
the control unit is further configured to select a first velocity as the switchover velocity when the accelerator opening degree is in a first opening degree, and to select a second velocity that is different from the first velocity as the switchover velocity when the accelerator opening degree is in a second opening degree that is different from the first opening degree.

3. The construction vehicle of claim 2, wherein
the first velocity is set to a velocity at which a traction force during a one-motor traveling mode for traveling by using the driving force of the first hydraulic motor matches a traction force during a two-motor traveling mode for traveling by using the driving force of the first hydraulic motor and the second hydraulic motor when the accelerator opening degree is in the first opening degree, and
the second velocity is set to a velocity at which the traction force during the one-motor traveling mode matches the traction force during the two-motor traveling mode when the accelerator opening degree is in the second opening degree.

4. The construction vehicle of claim 2, wherein
the control unit is configured to select the first velocity as the switchover velocity when the accelerator opening degree is within a first opening degree range, and to select the second velocity as the switchover velocity when the accelerator opening degree is within a second opening degree range that is different from the first opening degree range.

5. The construction vehicle of claim 1, wherein
the control unit is configured to increase or decrease the switchover velocity depending on increase or decrease of the accelerator opening degree when the accelerator opening degree is at least within a predetermined opening degree range.

6. A construction vehicle, comprising:

an engine;

a hydraulic pump configured to be driven by the engine;

first and second hydraulic motors configured to be driven by pressured oil discharged by the hydraulic pump, the first and second hydraulic motors being configured to respectively generate a driving force for traveling;

a driving shaft configured to receive the driving force from the first hydraulic motor and the driving force from the second hydraulic motor;

a clutch configured to selectively switch between a transmission state and a non-transmission state of the driving force from the second hydraulic motor to the driving shaft;

an engine rotation speed detection unit configured to detect a rotation speed of the engine;

a vehicle velocity detection unit configured to detect a vehicle velocity; and a control unit configured to determine a switchover velocity depending on the rotation speed of the engine detected by the engine rotation speed detection unit, and to control the clutch to switch between the transmission state and the non-transmission state when the vehicle velocity detected by the vehicle velocity detection unit reaches the switchover velocity.

7. The construction vehicle of claim 6, wherein
the control unit is further configured to select a first velocity as the switchover velocity when the rotation speed of the engine is in a first engine rotation speed, and to select a second velocity that is different from the first velocity as the switchover velocity when the rotation speed of the engine is in a second engine rotation speed that is different from the first engine rotation speed.

8. The construction vehicle of claim 7, wherein
the first velocity is set to be a velocity at which a traction force during a one-motor traveling mode for traveling by using the drive force of the first hydraulic motor matches a traction force during a two-motor traveling mode for traveling by using the drive force the first hydraulic motor and the second hydraulic motor when the rotation speed of the engine is in the first engine rotation speed, and the second velocity is set to be a velocity at which the traction force during the one-motor traveling mode matches the traction force during the two-motor traveling mode when the rotation speed of the engine is in the second engine rotation speed.

9. The construction vehicle of claim 7, wherein
the control unit is further configured to select the first velocity as the switchover velocity when the rotation speed of the engine is within a first rotation speed range, and to select the second velocity as the switchover velocity when the rotation speed of the engine is within a second rotation speed range that is different from the first rotation speed range.

10. The construction vehicle of claim 6, wherein
the control unit is configured to increase or decrease the switchover velocity depending on increase or decrease of the rotation speed of the engine when the rotation speed of the engine is at least within a predetermined rotation speed range.

* * * * *